United States Patent
Sakata

(10) Patent No.: US 11,207,928 B2
(45) Date of Patent: Dec. 28, 2021

(54) PNEUMATIC TIRE

(71) Applicant: TOYO TIRE & RUBBER CO., LTD., Itami (JP)

(72) Inventor: Hirokazu Sakata, Itami (JP)

(73) Assignee: TOYO TIRE CORPORATION, Itami (JP)

(*) Notice: Subject to any disclaimer, the term of this patent is extended or adjusted under 35 U.S.C. 154(b) by 431 days.

(21) Appl. No.: 16/188,863

(22) Filed: Nov. 13, 2018

(65) Prior Publication Data

US 2019/0160888 A1    May 30, 2019

(30) Foreign Application Priority Data

Nov. 30, 2017    (JP) .............................. JP2017-230211

(51) Int. Cl.
*B60C 15/00*    (2006.01)
*B60C 15/06*    (2006.01)
(Continued)

(52) U.S. Cl.
CPC .......... *B60C 15/0036* (2013.01); *B60C 9/023* (2013.01); *B60C 9/08* (2013.01);
(Continued)

(58) Field of Classification Search
CPC ............ B60C 15/0027; B60C 15/0036; B60C 15/0603

See application file for complete search history.

(56) References Cited

U.S. PATENT DOCUMENTS 8,037,913 B2 * 10/2011 Niedermier ........... B60C 9/0207
                                                                152/548
2004/0055687 A1 * 3/2004 Whitney ............. B60C 17/0009
                                                                152/517
2009/0188601 A1    7/2009 Kuniyasu

FOREIGN PATENT DOCUMENTS

JP    H11-321217 A    11/1999
JP    2007-302018 A    11/2007
(Continued)

OTHER PUBLICATIONS

"Reinforcing Materials in Rubber Products", Nokian Tyres (Year: 2015).*
(Continued)

*Primary Examiner* — Timothy Kennedy
*Assistant Examiner* — Alexander A Wang
(74) *Attorney, Agent, or Firm* — Westerman, Hattori, Daniels & Adrian, LLP

(57) ABSTRACT

A pneumatic tire includes: paired bead portions respectively including annular bead cores and bead fillers disposed on an outer side in a tire radial direction of the bead cores; sidewall portions respectively extending outward in the tire radial direction from the bead portions; a tread portion connected to outer ends in the tire radial direction of the sidewall portions to form a tread; and a carcass layer suspended between the bead portions. The carcass layer has a first ply that continuously extends between the bead portions and that has opposite end portions respectively and a second ply that continuously extends on the outer side in the tire radial direction of the first ply, wherein the first ply has higher tensile strength than that of the second ply, and the end portion is positioned on the outer side in the tire radial direction of the end.

3 Claims, 4 Drawing Sheets

(51) Int. Cl.
  *B60C 9/08* (2006.01)
  *B60C 9/02* (2006.01)
  *B60C 19/00* (2006.01)
  *B60C 9/04* (2006.01)

(52) U.S. Cl.
  CPC ...... *B60C 15/0009* (2013.01); *B60C 15/0054* (2013.01); *B60C 15/06* (2013.01); *B60C 15/0603* (2013.01); *B60C 19/001* (2013.01); *B60C 2009/045* (2013.01); *B60C 2015/009* (2013.01); *B60C 2015/061* (2013.01); *B60C 2015/0614* (2013.01)

(56) References Cited

FOREIGN PATENT DOCUMENTS

| | | |
|---|---|---|
| JP | 2008-279796 A | 11/2008 |
| WO | 2014/126701 A1 | 8/2014 |

OTHER PUBLICATIONS

Office Action dated Jun. 28, 2020, issued in counterpart CN Application No. 201811362014.2, with English Translation. (14 pages).
Office Action dated Mar. 11, 2021, issued in counterpart CN Application No. 201811362014.2, with English translation.(13 pages).
Office Action dated Aug. 10, 2021, issued in counterpart JP application No. 2017-230211, with English translation. (6 pages).

\* cited by examiner

PNEUMATIC TIRE

BACKGROUND OF THE INVENTION

Field of the Invention

The present invention relates to a pneumatic tire and particularly to a pneumatic tire including a carcass layer formed by two or more carcass plies.

Description of the Related Art

A general pneumatic tire includes paired bead portions, sidewall portions respectively extending outward in a tire radial direction from the bead portions, a tread portion connected to outer ends in the tire radial direction of the sidewall portions to form a tread, and a carcass layer suspended between the paired bead portions.

In a case of such a pneumatic tire, the carcass layer may be formed by two carcass plies in some cases in order to increase tire rigidity and improve steering stability (see Patent Document 1 below, for example). However, the carcass layer formed by the two carcass plies increases a weight and deteriorates a rolling resistance.

PRIOR ART DOCUMENT

Patent Document

Patent Document 1: JP-A-2007-302018

SUMMARY OF THE INVENTION

The present invention has been made with the above-described circumstances in view and its object is to provide a pneumatic tire with which steering stability can be improved while increase in weight and rolling resistance of the tire is suppressed.

A pneumatic tire according to the present invention is a pneumatic tire including:

paired bead portions respectively including annular bead cores and bead fillers disposed on an outer side in a tire radial direction of the bead cores;

sidewall portions respectively extending outward in the tire radial direction from the bead portions;

a tread portion connected to outer ends in the tire radial direction of the sidewall portions to form a tread; and a carcass layer suspended between the bead portions, wherein the carcass layer has a first ply that continuously extends between the bead portions and that has opposite end portions respectively roiled up around the bead cores from inner sides in a tire width direction toward outer sides in the tire width direction and a second ply that continuously extends on the outer side in the tire radial direction of the first ply between the bead portions and that has opposite end portions respectively rolled up around the bead cores from the inner sides in the tire width direction toward the outer sides in the tire width direction, the first ply has higher tensile strength than the tensile strength of the second ply, and the end portion disposed on an outside in mounting to a vehicle out of the opposite end portions of the first ply is positioned on the outer side in the tire radial direction of the end portion of the first ply disposed on an inside in the mounting to the vehicle.

The carcass layer in the invention has the first ply and the second ply, the first ply has the higher tensile strength than the tensile strength of the second ply, and the first ply has greater influences on rigidity and a weight than the second ply. Because the end portion disposed on the outside in the mounting to the vehicle out of the opposite end portions of the first ply is positioned on the outer side in the tire radial direction of the end portion of the first ply disposed on the inside in the mounting to the vehicle, a rolled-up height of the first ply disposed on the outside in the mounting to the vehicle is relatively greater. In this way, it is possible to increase rigidity of the sidewall portion positioned on the outside in the mounting to the vehicle, a load being applied to the sidewall portion on the outside during cornering, to thereby improve the steering stability. On the other hand, a rolled-up height of the first ply disposed on the inside in the mounting to the vehicle is relatively smaller, which suppresses the increase in the weight and the rolling resistance.

In the present invention, the end portion of the first ply disposed on the outside in the mounting to the vehicle may be positioned on the outer side in the tire radial direction of an outer end in the tire radial direction of the bead filler and the end portion of the first ply disposed on the inside in the mounting to the vehicle may be positioned on an inner side in the tire radial direction of an outer end in the tire radial direction of the bead filler.

With this structure, it is possible to effectively improve the steering stability while suppressing the increase in the weight and the rolling resistance.

In the present invention, the end portion disposed on the inside in the mounting to the vehicle out of the opposite end portions of the second ply may be positioned on the outer side in the tire radial direction of the end portion of the second ply disposed on the outside in the mounting to the vehicle.

With this structure, the tire as a whole has a satisfactory balance between left and right sides, which improves the steering stability.

In the present invention, the end portion of the second ply disposed on the inside in the mounting to the vehicle may be positioned on the outer side in the tire radial direction of an outer end in the tire radial direction of the bead filler and the end portion of the second ply disposed on the outside in the mounting to the vehicle may be positioned on an inner side in the tire radial direction of an outer end in the tire radial direction of the bead filler.

With this structure, the tire as a whole has a satisfactory balance between left and right sides, which improves the steering stability.

In the present invention, the end portion of the first ply disposed on the outside in the mounting to the vehicle may be positioned on the outer side in the tire radial direction of the end portion of the second ply disposed on the outside in the mounting to the vehicle.

With this structure, the first ply having the relatively higher tensile strength covers the end portion of the second ply, which improves durability.

DETAILED DESCRIPTION OF THE PREFERRED EMBODIMENTS

Embodiments of the present invention will be described below with reference to the drawings.

Figure 1:
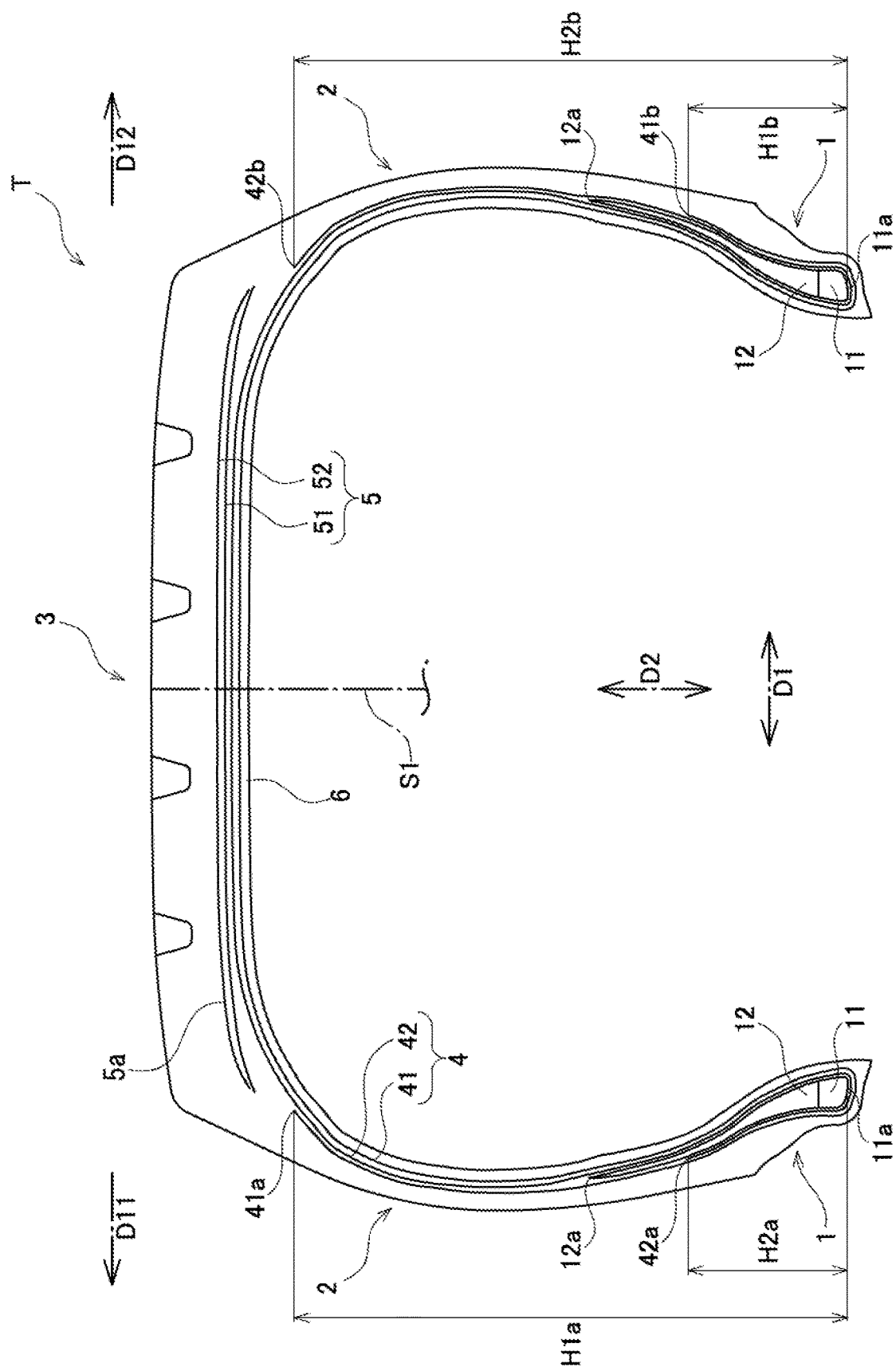
FIG. 1 is a sectional view along a tire meridian and schematically showing an example of a pneumatic tire according to the present invention.

A pneumatic tire T shown in FIG. 1 includes paired bead portions 1, sidewall portions 2 respectively extending outward in a tire radial direction D2 from the bead portions 1, a tread portion 3 connected to outer ends in the tire radial direction D2 of the sidewall portions 2 to form a tread, a carcass layer 4 suspended between the paired bead portions 1, and a belt layer 5 provided on an outer side in the tire radial direction D2 of the carcass layer 4 in the tread portion 3.

In FIG. 1, a tire width direction D1 is a left-right direction. A tire radial direction D2 is a diameter direction of the tire 1 and a tire circumferential direction is a direction around a tire rotation axis. A tire equatorial plane S1 is a plane orthogonal to the tire rotation axis and positioned at a center in the tire width direction D1 and a tire meridional plane is a plane including the tire rotation axis and orthogonal to the tire equatorial plane S1.

Each of the paired bead portions 1 includes a bead core 11 which is a bundle of steel wires having an annular shape in the tire circumferential direction and a bead filler 12 disposed on an outer side in the tire radial direction D2 of the bead core 11.

The belt layer 5 includes at least two layers of belt plies 51, 52. In the present embodiment, the belt layer 5 includes the two layers of belt plies 51, 52. Each of the belt plies 51, 52 includes a plurality of belt cords arranged parallel with each other and a topping rubber covering the belt cords.

The respective belt plies 51, 52 are layered so that the groups of belt cords in the respective plies are inclined at predetermined inclination angles (e.g., 15 to 35) to the tire circumferential direction in opposite orientations to each other and cross each other. For the belt cords, organic fibers such as polyester, rayon, nylon, and aramid or metal such as steel are/is used suitably. A belt reinforcing layer formed by cords extending substantially in the tire circumferential direction and covered with rubber may be provided on an outer periphery of the belt layer 5.

The pneumatic tire T according to the embodiment has an asymmetric structure with respect to the tire equatorial plane S1. The pneumatic tire T is a tire which is to be mounted to a vehicle in a prescribed direction and which of left and right sides of the pneumatic tire T should face the vehicle when the pneumatic tire T is mounted to a rim is prescribed. A tread pattern formed on a tire outer surface at the tread portion 3 may have a symmetric structure or an asymmetric structure with respect to the tire equatorial plane S1.

The sidewall portions 2 have signs indicating directions in which the tire is to be mounted to the vehicle. To put it concretely, the sidewall portions 2 have, on their outer surfaces, display portions showing the directions in which the tire is to be mounted to the vehicle. In the embodiment, one of the sidewall portions 2 disposed on an outside (left side in FIG. 1) when the tire is mounted to the vehicle has a sign showing that this side is to be on the outside of the vehicle (e.g., "OUTSIDE") and the other sidewall portion 2 disposed on an inside (right side in FIG. 1) has a sign showing that this side is to be on the inside of the vehicle (e.g., "INSIDE"). In the tire width direction D1, an outward direction in the mounting to the vehicle is referred to as "vehicle outward direction D11" and an inward direction in the mounting to the vehicle is referred to as "vehicle inward direction D12".

The carcass layer 4 includes a first carcass ply 41 (corresponding to a first ply) and a second carcass ply 42 (corresponding to a second ply). On an inner side of the carcass layer 4, an inner liner rubber 6 that is excellent in preventing permeation of gas is disposed in order to maintain air pressure.

Each of the first carcass ply 41 and the second carcass ply 42 includes a plurality of ply cords arranged in a direction substantially orthogonal to the tire circumferential direction and a topping rubber covering the ply cords. For the ply cords, organic fibers such as polyester, rayon, nylon, and aramid are used.

The first carcass ply 41 has higher tensile strength than the tensile strength of the second carcass ply 42. Here, the tensile strength of the first carcass ply 41 refers to a load under which the ply cords rupture during a tensile test. The tensile strength of the second carcass ply 42 refers to the same. The tensile strength can be adjusted by adjusting cord diameters of the ply cords, a density at which the ply cords are arranged per unit width, and the like, for example. In other words, in order to increase the tensile strength, the cord diameters of the ply cords may be increased or the density at which the ply cords are arranged per unit width may be increased. In general, if the tensile strength is high, a weight of the carcass ply per unit width is heavy.

The first carcass ply 41 continuously extends between the bead portions 1 and has opposite end portions 41a, 41b respectively rolled up around the bead cores 11 from an inner side in the tire width direction D1 toward an outer side in the tire width direction D1.

Out of the opposite end portions 41a, 41b of the first carcass ply 41, the end portion 41a disposed on the outside in the mounting to the vehicle is positioned on an outer side in the tire radial direction D2 of the end portion 41b disposed on the inside in the mounting to the vehicle.

The end portion 41a disposed on the outside in the mounting to the vehicle is positioned on the outer side in the tire radial direction D2 of an outer end 12a in the tire radial direction D2 of the bead filler 12. On the other hand, the end portion 41b disposed on the inside in the mounting to the vehicle is positioned on an inner side in the tire radial direction D2 of the outer end 12a in the tire radial direction D2 of the bead filler 12.

As a result, a rolled-up height H1a of the first carcass ply 41 positioned on the outside in the mounting to the vehicle (a distance in the tire radial direction D2 between an inner end 11a in the tire radial direction D2 of the bead core 11 and the end portion 41a) is relatively greater. In this way, it is possible to increase rigidity of the sidewall portion 2 positioned on the outside in the mounting to the vehicle, a load being applied to the sidewall portion 2 on the outside, to thereby improve steering stability. On the other hand, a rolled-up height H1b of the first carcass ply 41 positioned on the inside in the mounting to the vehicle (a distance in the tire radial direction D2 between an inner end 11a in the tire radial direction D2 of the bead core 11 and the end portion 41b) is relatively smaller. In this way, it is possible to suppress increase in weight and rolling resistance.

The second carcass ply 42 continuously extends between the bead portions 1 and has opposite end portions 42a, 42b respectively rolled up around the bead cores 11 from inner sides in the tire width direction D1 toward outer sides in the tire width direction D1. The second carcass ply 42 is adjacent to an outer side in the tire radial direction D2 of the first carcass ply 41. In other words, the second carcass ply 42 and the first carcass ply 41 are arranged in this order outward from peripheries of the bead cores 11.

Out of the opposite end portions 42a, 42b of the second carcass ply 42, the end portion 42b disposed on the inside in the mounting to the vehicle is positioned on the outer side in the tire radial direction D2 of the end portion 42a disposed on the outside in the mounting to the vehicle. In other words, a relied-up height H2b of the second carcass ply 42 disposed on the inside in the mounting to the vehicle (a distance in the tire radial direction D2 between the inner end 11a in the tire radial direction D2 of the bead core 11 and the end portion 42b) is greater than a rolled-up height H2a of the second carcass ply 42 disposed on the outside in the mounting to the vehicle (a distance in the tire radial direction D2 between the inner end 11a in the tire radial direction D2 of the bead core 11 and the end portion 42a).

The end portion 42b disposed on the inside in the mounting to the vehicle is positioned on the outer side in the tire radial direction D2 of the outer end 12a in the tire radial direction D2 of the bead filler 12. On the other hand, the end portion 42a disposed on the outside in the mounting to the vehicle is positioned on the inner side in the tire radial direction D2 of the outer end 12a in the tire radial direction D2 of the bead filler 12.

In the pneumatic tire T in the embodiment, the left and right rolled-up heights H2a, H2b of the second carcass ply 42 has a reversed size relationship of a size relationship between the left and right rolled-up heights H1a, H1b of the first carcass ply 41. As a result, the tire as a whole has a satisfactory balance between left and right sides, which improves the steering stability. In the pneumatic tire T, a rigidity difference between the sidewall portion 2 disposed on the outside in the mounting to the vehicle and the sidewall portion 2 disposed on the inside in the mounting to the vehicle is preferably 40% or smaller. A large rigidity difference impairs uniformity.

The end portion 41a of the first carcass ply 41 disposed on the outside in the mounting to the vehicle is positioned on the outer side in the tire radial direction D2 of the end portion 42a of the second careass ply 42 disposed on the outside in the mounting to the vehicle. In this way, the first carcass ply 41 having relatively higher tensile strength covers the end portion 42a of the second carcass piy 42, which improves durability.

The end portion 41a of the first carcass ply 41 disposed on the outside in the mounting to the vehicle may be disposed to be in contact with an inner peripheral face of an end portion 5a of the belt layer 5 disposed on the outside in the mounting to the vehicle. In this way, the first carcass ply 41 having the relatively higher tensile strength is disposed on a tire outer surface side in the shoulder portion positioned on the outside in the mounting to the vehicle, which improves cutting resistance and puncture resistance.

Although the embodiment of the invention has been described above based on the drawings, specific structures should not be considered restricted to those in the embodiment. The scope of the invention is defined not only by the above description of the embodiment but also by the claims and includes meanings equivalent to the claims and all modifications in the scope of the claims.

It is possible to employ structures, employed in the above embodiment, in other arbitrary embodiments. Specific structures of the respective portions are not limited to those in the above embodiment but can be changed in various ways without departing from the gist of the invention.

[Other Embodiments]

Figure 2:
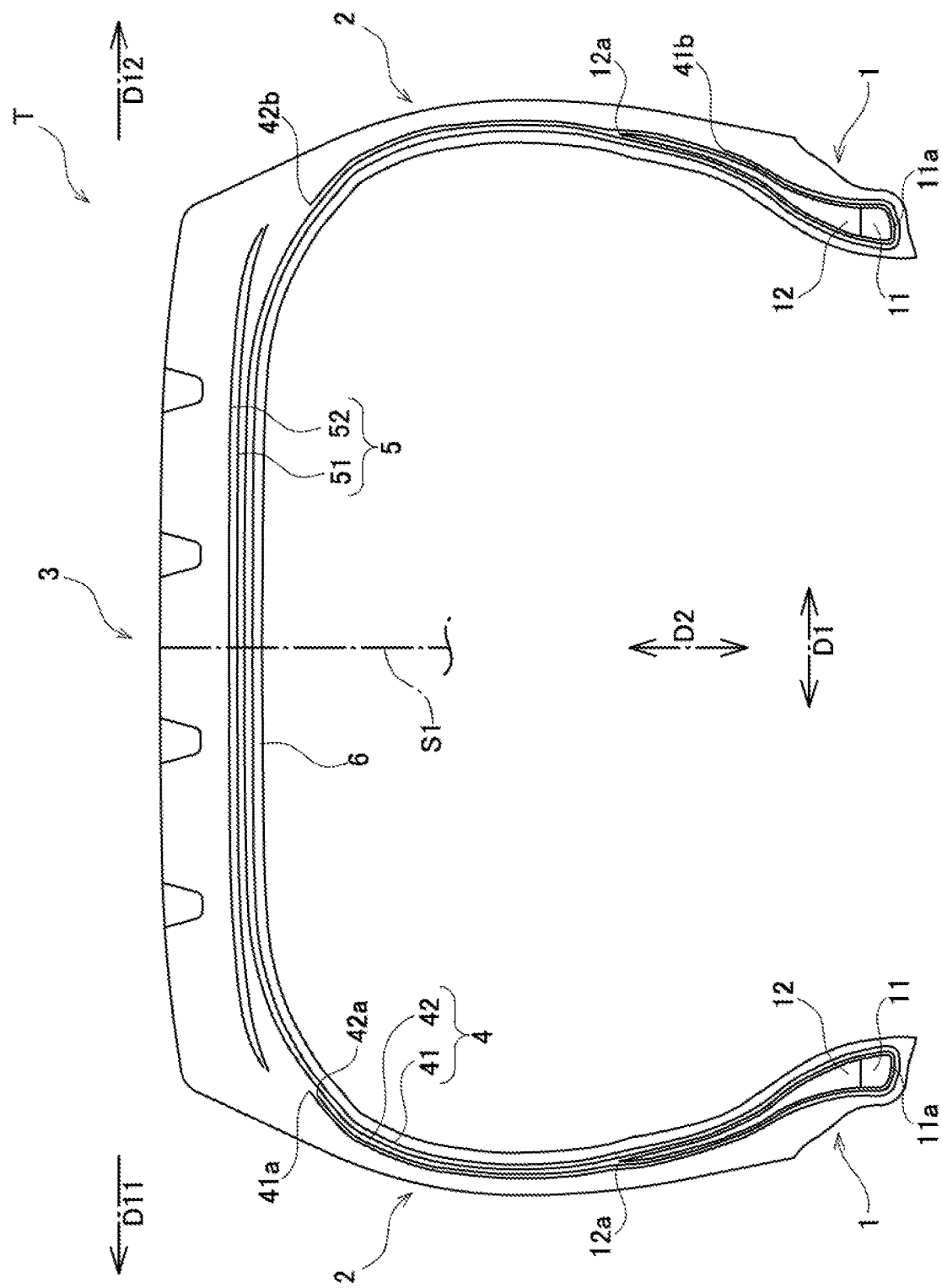
FIG. 2 is a sectional view along a tire meridian and schematically showing a pneumatic tire according to another embodiment.

(1) As shown in FIG. 2, in a pneumatic tire T, an end portion 42a of a second carcass ply 42 disposed on an outside in mounting to a vehicle may be positioned on an outer side in a tire radial direction D2 of an outer end 12a in the tire radial direction D2 of a bead filler 12. In this way, it is possible to further increase rigidity of a sidewall portion 2 positioned on the outside in the mounting to the vehicle to thereby improve steering stability. An end portion 41a of a first carcass ply 41 disposed on the outside in the mounting to the vehicle is preferably positioned on the outer side in the tire radial direction D2 of the end portion 42a of the second carcass ply 42 disposed on the outside in the mounting to the vehicle.

Figure 3:
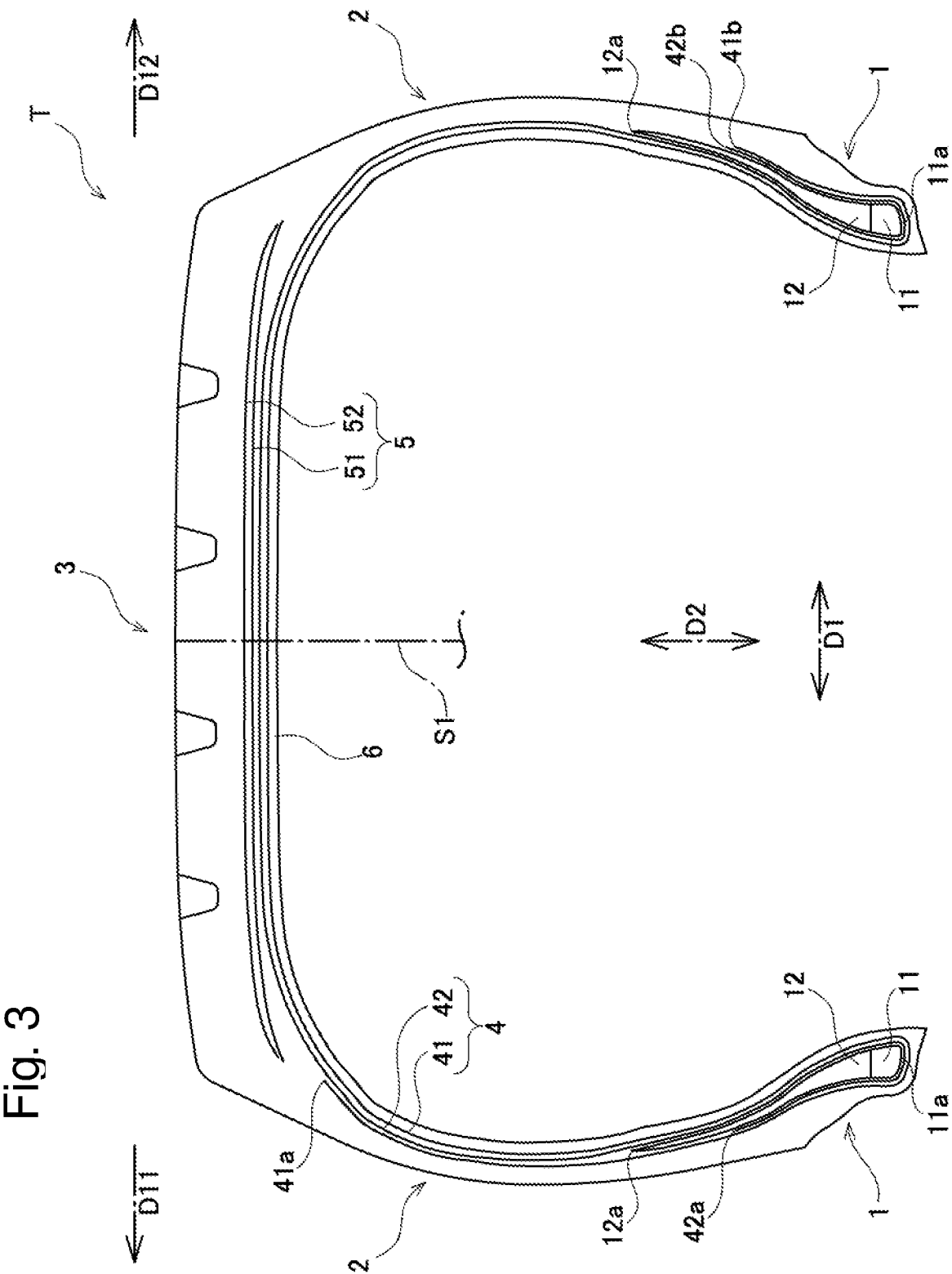
FIG. 3 is a sectional view along a tire meridian and schematically showing a pneumatic tire according to another embodiment.

(2) As shown in FIG. 3, in a pneumatic tire T, an end portion 42b of a second carcass ply 42 disposed on an inside in mounting to a vehicle may be positioned on an inner side in a tire radial direction D2 of an outer end 12a in the tire radial direction D2 of a bead filler 12. In this way, a rolled-up height of the second carcass ply 42 disposed on the inside in the mounting to the vehicle is small, which further suppresses increase in weight and rolling resistance.

Figure 4:
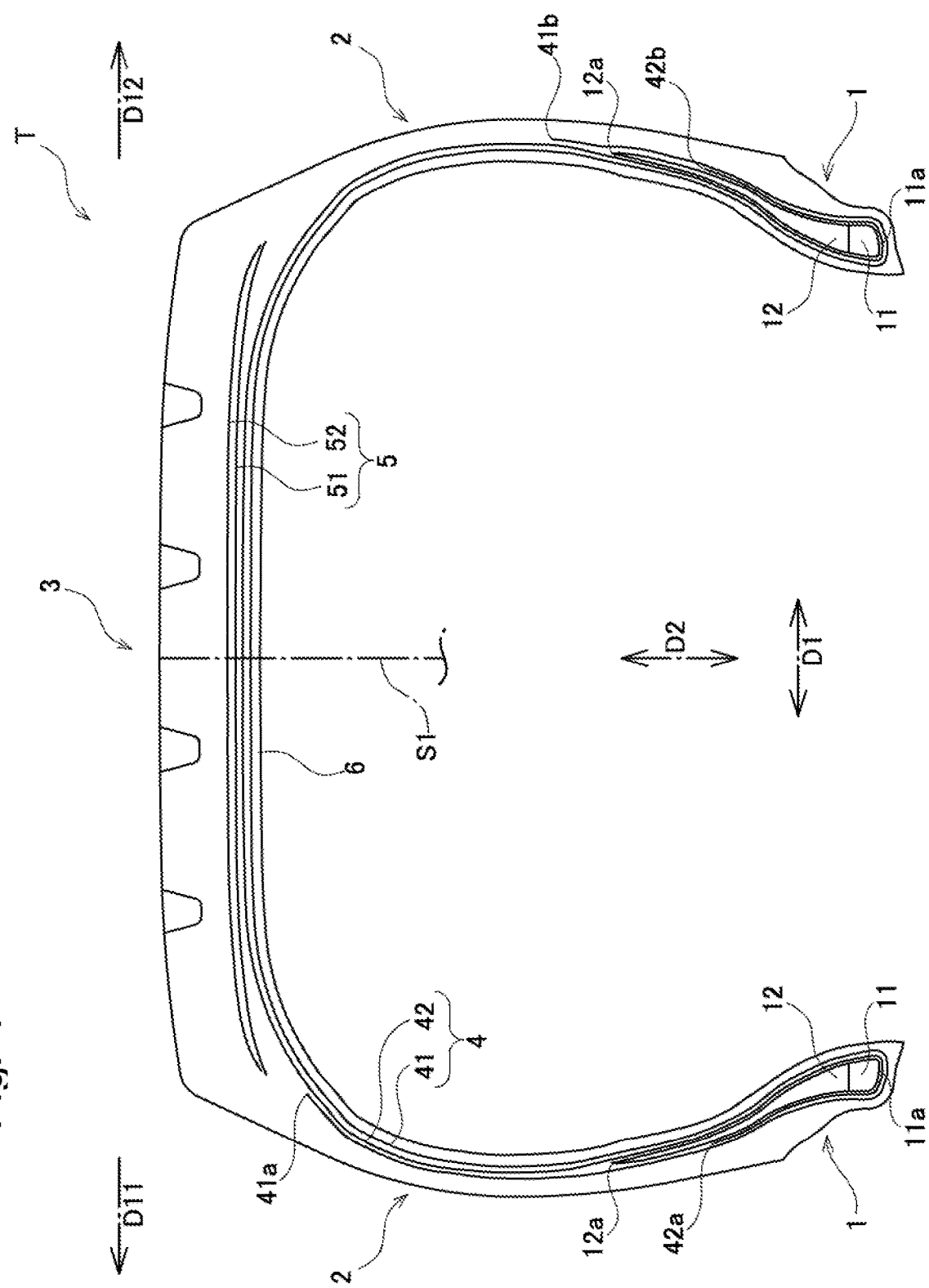
FIG. 4 is a sectional view along a tire meridian and schematically showing a pneumatic tire according to another embodiment.

(3) As shown in FIG. 4, in a pneumatic tire T, an end portion 41b of a first carcass ply 41 disposed on an inside in mounting to a vehicle may be positioned on an outer side in a tire radial direction D2 of an outer end 12a in the tire radial direction D2 of a bead filler 12.

What is claimed is:

1. A pneumatic tire comprising:
paired bead portions respectively including annular bead cores and bead fillers disposed on an outer side in a tire radial direction of the bead cores;
sidewall portions respectively extending outward in the tire radial direction from the bead portions;
a tread portion connected to outer ends in the tire radial direction of the sidewall portions to form a tread; and
a carcass layer suspended between the bead portions, wherein
the carcass layer has a first ply that continuously extends between the bead portions and that has opposite end portions respectively rolled up around the bead cores from inner sides in a tire width direction toward outer sides in the tire width direction and a second ply that continuously extends on the outer side in the tire radial direction of the first ply between the bead portions and that has opposite end portions respectively rolled up around the bead cores from the inner sides in the tire width direction toward the outer sides in the tire width direction,
the first ply has higher tensile strength than the tensile strength of the second ply, and
the end portion of the first ply disposed on an outside in mounting to a vehicle out of the opposite end portions of the first ply is positioned on the outer side in the tire radial direction of the end portion of the first ply disposed on an inside in the mounting to the vehicle out of the opposite end portions of the first ply,
the end portion of the second ply disposed on the inside in the mounting to the vehicle out of the opposite end portions of the second ply is positioned on the outer side in the tire radial direction of the end portion of the second ply disposed on the outside in the mounting to the vehicle out of the opposite end portions of the second ply, and the end portion of the second ply disposed on the inside in the mounting to the vehicle out of the opposite end portions of the second ply is positioned on the outer side in the tire radial direction of an outer end in the tire radial direction of the bead filler on the inside in the mounting to the vehicle, and the end portion of the second ply disposed on the outside in the mounting to the vehicle out of the opposite end portions of the second ply is positioned on the outer side in the tire radial direction of an outer end in the tire radial direction of the bead filler on the outside in the mounting to the vehicle.

2. The pneumatic tire according to claim 1, wherein the end portion of the first ply disposed on the outside in the mounting to the vehicle out of the opposite end portions of the first ply is positioned on the outer side in the tire radial direction of the end portion of the second ply disposed on the outside in the mounting to the vehicle out of the opposite end portions of the second ply.

3. A pneumatic tire comprising:

paired bead portions respectively including annular bead cores and bead fillers disposed on an outer side in a tire radial direction of the bead cores;

sidewall portions respectively extending outward in the tire radial direction from the bead portions;

a tread portion connected to outer ends in the tire radial direction of the sidewall portions to form a tread; and a carcass layer suspended between the bead portions, wherein the carcass layer has a first ply that continuously extends between the bead portions and that has opposite end portions respectively rolled up around the bead cores from inner sides in a tire width direction toward outer sides in the tire width direction and a second ply that continuously extends on the outer side in the tire radial direction of the first ply between the bead portions and that has opposite end portions respectively rolled up around the bead cores from the inner sides in the tire width direction toward the outer sides in the tire width direction, the first ply has higher tensile strength than the tensile strength of the second ply, and the end portion of the first ply disposed on an outside in mounting to a vehicle out of the opposite end portions of the first ply is positioned on the outer side in the tire radial direction of the end portion of the first ply disposed on an inside in the mounting to the vehicle out of the opposite end portions of the first ply, the end portion of the second ply disposed on the inside in the mounting to the vehicle out of the opposite end portions of the second ply is positioned on the outer side in the tire radial direction of the end portion of the second ply disposed on the outside in the mounting to the vehicle out of the opposite end portions of the second ply, and the end portion of the second ply disposed on the inside in the mounting to the vehicle out of the opposite end portions of the second ply is positioned on an inner side in the tire radial direction of an outer end in the tire radial direction of the bead filler on the inside in the mounting to the vehicle, and the end portion of the second ply disposed on the outside in the mounting to the vehicle out of the opposite end portions of the second ply is positioned on the inner side in the tire radial direction of an outer end in the tire radial direction of the bead filler on the outside in the mounting to the vehicle.

* * * * *